(12) United States Patent
Vashisht

(10) Patent No.: US 11,368,475 B1
(45) Date of Patent: Jun. 21, 2022

(54) SYSTEM AND METHOD FOR SCANNING REMOTE SERVICES TO LOCATE STORED OBJECTS WITH MALWARE

(71) Applicant: FireEye, Inc., Milpitas, CA (US)

(72) Inventor: Sai Vashisht, Morgan Hill, CA (US)

(73) Assignee: FireEye Security Holdings US LLC, Milpitas, CA (US)

( * ) Notice: Subject to any disclaimer, the term of this patent is extended or adjusted under 35 U.S.C. 154(b) by 468 days.

(21) Appl. No.: 16/231,074

(22) Filed: Dec. 21, 2018

(51) Int. Cl.
G06F 16/9535 (2019.01)
H04L 9/40 (2022.01)

(52) U.S. Cl.
CPC ...... *H04L 63/1425* (2013.01); *G06F 16/9535* (2019.01); *H04L 63/10* (2013.01)

(58) Field of Classification Search
CPC .. H04L 63/1425; H04L 63/10; G06F 16/9535
See application file for complete search history.

(56) References Cited

U.S. PATENT DOCUMENTS

| | | | |
|---|---|---|---|
| 4,292,580 A | 9/1981 | Ot et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Pandey et al., "Performance of Malware Detection Tools: A Comparison", May 2014, IEEE International Conference on Advanced Communications, Control and Computing Technologies, pp. 1811-1817 (Year: 2014).*

(Continued)

*Primary Examiner* — Kenneth W Chang
(74) *Attorney, Agent, or Firm* — Rutan & Tucker, LLP

(57) ABSTRACT

A system and method for retrieval and analysis of stored objects for malware is described. The method involves receiving a scan request message from a customer to conduct analytics on one or more objects stored within a third-party controlled service. In response to receipt of the scan request message, the system generates a redirect message. The redirect message redirects the customer to an authentication portal of the third-party controlled service operating as a logon page and configures receipt by the system of access credentials for the third-party controlled service upon verification of the customer. Using the access credentials, the system is able to retrieve the one or more objects using the access credentials and performing analytics on each object of the one or more objects to classify each object as malicious or benign.

18 Claims, 7 Drawing Sheets

(56) References Cited

U.S. PATENT DOCUMENTS

| | | |
|---|---|---|
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,011,010 B2* | 8/2011 | Michael ............ G06F 21/562 726/24 |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Fuvell et al. |
| 8,321,936 B1 | 11/2012 | Green et al. |
| 8,321,941 B2 | 11/2012 | Fuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Viz |
| 8,533,824 B2 | 9/2013 | Hutton et al. |

(56) References Cited

U.S. PATENT DOCUMENTS

| | | |
|---|---|---|
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,197,665 B1 * | 11/2015 | Cabot ............... H04L 29/06 |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,405,902 B1 * | 8/2016 | Xavier ............... H04L 63/1441 |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |

(56) References Cited

U.S. PATENT DOCUMENTS

| | | |
|---|---|---|
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |

(56) References Cited

U.S. PATENT DOCUMENTS

| | | |
|---|---|---|
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Proves et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023579 A1* | 1/2012 | Zaitsev .................. G06F 21/56 726/23 |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |

(56) References Cited

U.S. PATENT DOCUMENTS

| | | |
|---|---|---|
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0067549 A1* | 3/2013 | Caldwell ............ H04L 67/10 726/7 |
| 2013/0074185 A1 | 3/2013 | McDougal et al. |
| 2013/0086670 A1* | 4/2013 | Vangpat ............ H04L 63/102 726/8 |
| 2013/0086684 A1 | 4/2013 | Mohler |
| 2013/0097699 A1 | 4/2013 | Balupar et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139260 A1* | 5/2013 | McDougal ............ G06F 21/567 726/23 |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1* | 4/2015 | Vincent ............ G06F 21/562 726/23 |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0121526 A1* | 4/2015 | McLarnon ............ H04L 63/14 726/23 |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0331905 A1* | 11/2015 | Brand ................ H04L 67/1095 707/770 |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0063251 A1* | 3/2016 | Spernow ............ G06F 21/562 726/23 |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0217285 A1* | 7/2016 | Boutnaru ............ H04L 63/1425 |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2016/0366119 A1* | 12/2016 | Rykowski ............ H04L 63/0815 |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&amumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C., et al., "Optimal Positioning of Active and Passive Monitoring Devices", International Conference on Emerging Net-

(56) References Cited

OTHER PUBLICATIONS working Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K , (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10 1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase © CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware letection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: a Statistical Viewpoint", ("Marchette"), (2001).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium Useni Security '08 Jul. 28-Aug. 1, 2008 San Jose, CA.
Reiner Sailer, Enriquillo Valdez, Trent Jaeger, Roonald Perez, Leendert van Doom, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham , "Insertion, Evasion, and Denial of Service: Eluding Network Intrusion Detection", Secure Networks, ("Ptacek"), (Jan. 1998).
Venezia, Paul , "NetDetector Captures Intrusions", InfoWorld Issue 27, ("Venezia"), (Jul. 14, 2003).
Vladimir Getov: "Security as a Service in Smart Clouds--Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

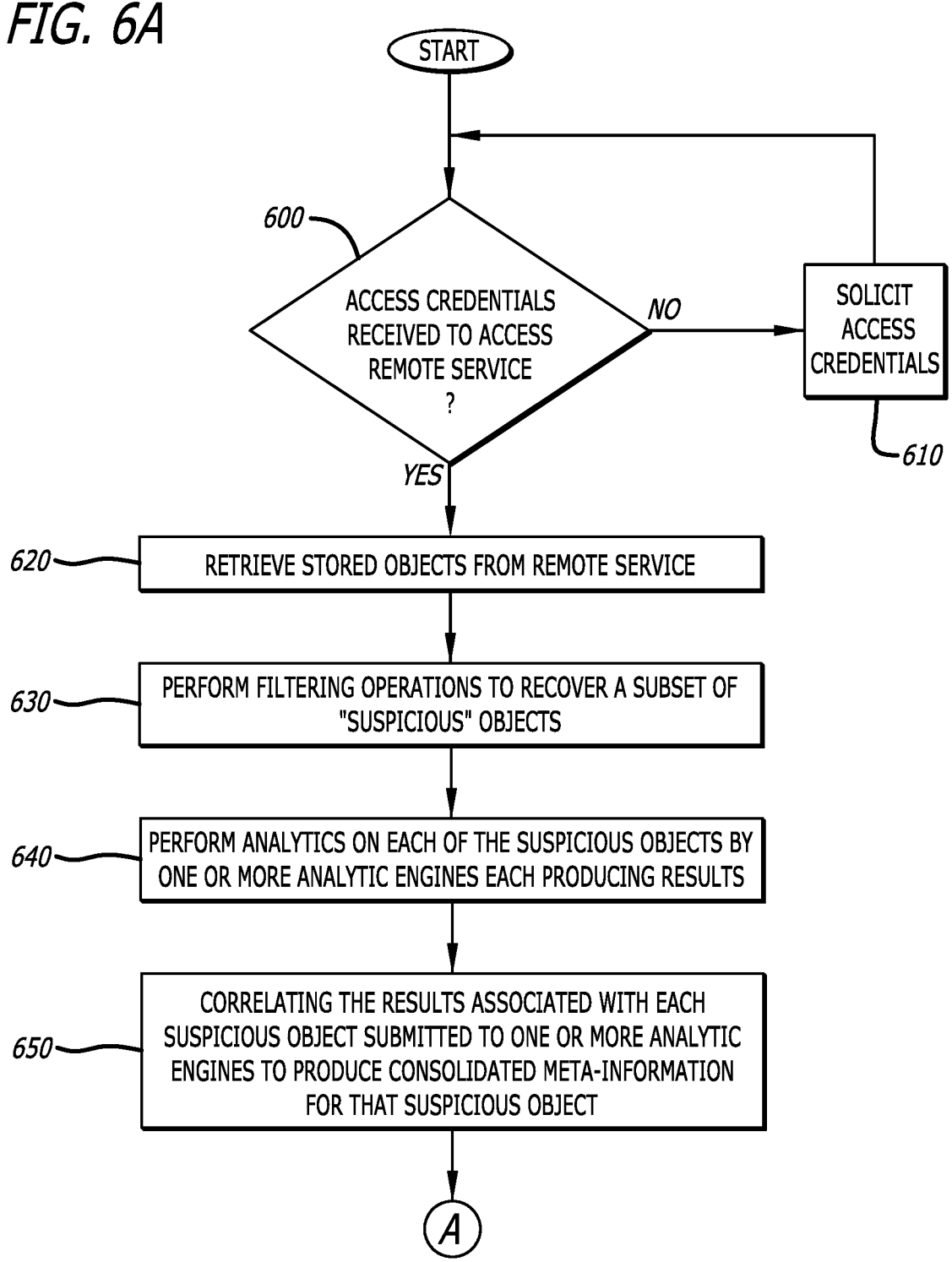

SYSTEM AND METHOD FOR SCANNING REMOTE SERVICES TO LOCATE STORED OBJECTS WITH MALWARE

FIELD

Embodiments of the disclosure relate to the field of cybersecurity. More specifically, one embodiment of the disclosure relates to a comprehensive cybersecurity system configured to access and analyze objects, stored within one or more remote services, for malware.

GENERAL BACKGROUND

Cybersecurity attacks have become a pervasive problem for organizations as many electronic devices within an enterprise network have been subjected to attack and compromised. A cybersecurity attack (sometimes referred to as a "cyberattack") constitutes a threat to security of an electronic device or a network itself caused by infiltration of content, such as executable (e.g., script, one or more commands, program, etc.) for example, with the intent to perpetrate unwanted, malicious or criminal activity. This type of content is generally referred to as "malware." Upon infiltration, the malware may lay dormant until activated in response to an activity by an unsuspecting user, such as opening an electronic mail (email) message, opening an attachment, or selecting a Uniform Resource Locator (URL) link.

Recently, email messages have become a significant cybersecurity threat vector for circumventing cybersecurity defenses to infect an electronic device connected to a network. Commonly, email cybersecurity solutions analyze email messages for cybersecurity risk (i) during transit to or upon receipt by an email server, or (ii) when the email message is being "opened" by an email client application being controlled by a user. Such email cybersecurity solutions do not analyze and detect resident malicious email messages (e.g., previously received email messages including malware) currently residing in user mailboxes. Stated differently, conventional cybersecurity solutions fail to offer any ability to analyze, for malware, any email messages already received, stored and allocated to different user mailboxes by an email server prior to installation of the cybersecurity solution or where malicious email messages evade cybersecurity defenses due to ineffective (inadequate or out of date) detection definitions. The conventional cybersecurity solutions are directed to monitoring and analyzing received incoming email messages for malware, not analyzing email messages already residing in the email server.

BRIEF DESCRIPTION OF THE DRAWINGS

Embodiments of the invention are illustrated by way of example and not by way of limitation in the figures of the accompanying drawings, in which like references indicate similar elements and in which:

FIGS. 6A-6B are an exemplary flowchart of the operations conducted by the retroactive malware detection system (RMDS) of FIG. 1 in performing analytics on the stored objects to detect a presence of malware.

DETAILED DESCRIPTION

Figure 1:
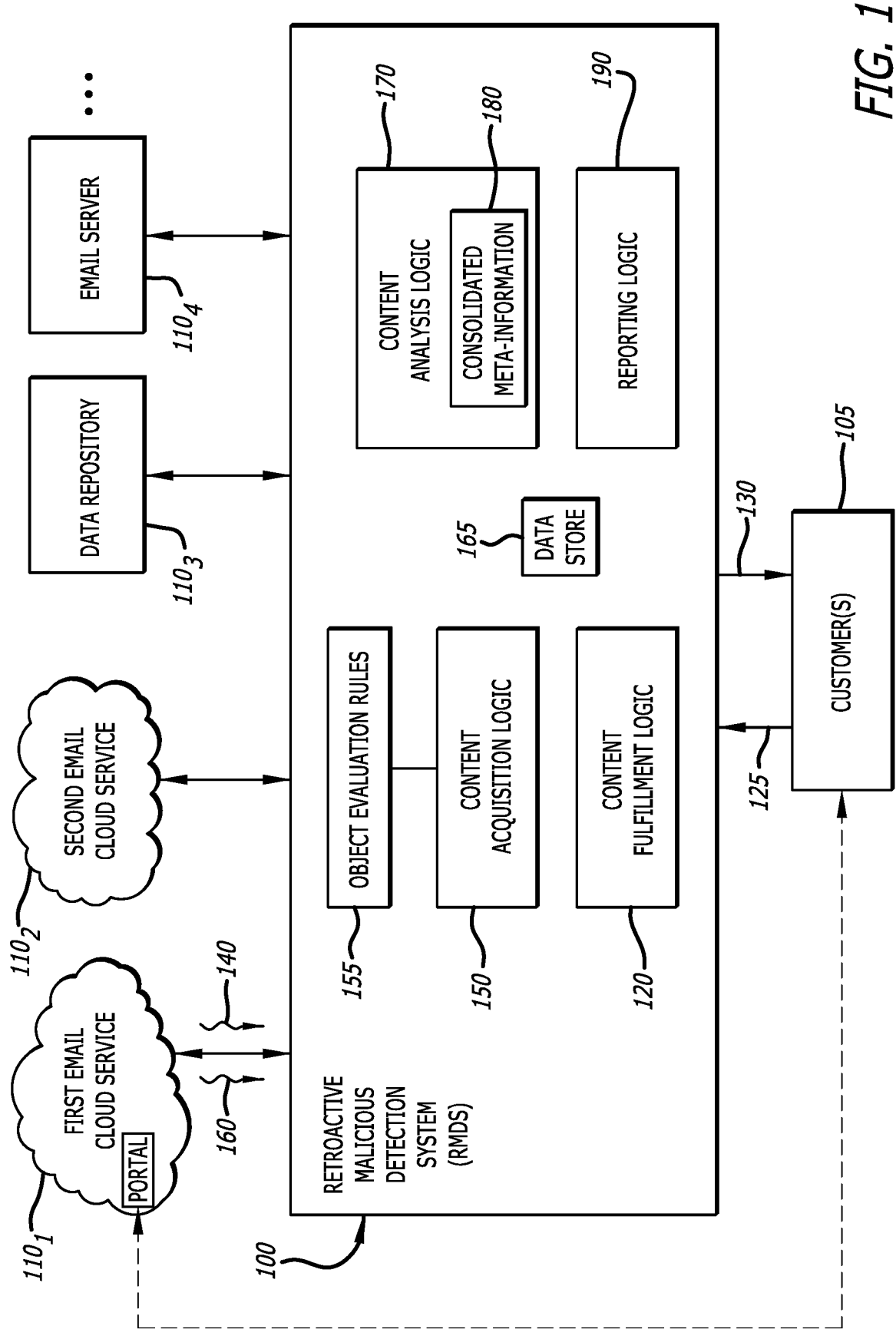
FIG. 1 is a block diagram of an exemplary embodiment of a retroactive malicious detection system (RMDS).

Embodiments of the present disclosure generally relate to a cybersecurity system and method that, depending on the embodiment, secures requisite credentials to retrieve stored objects (e.g., email messages, files, etc.) from a remote service to analyze whether the stored objects may include malware. As defined below, a remote service may correspond to a cloud-based hosted service by a third-party provider. For example, the remote service may operate as a cloud-based hosted service such as a cloud-based file data store (e.g. Dropbox), a cloud-based email and document data store (e.g., Microsoft® Office 365), a cloud-based server infrastructure service (e.g., Amazon Web Services "AWS" or Microsoft® Azure), or the like. Given the flexibility and cost savings offered by cloud-based hosted services, a greater number of companies are migrating to these services. In doing so, the protection of the stored data from malware infection is solely dependent on the security features deployed by the remote service, which may be devoid of advanced malware detection.

In particular, requests initiated from the cybersecurity system to a remote service, such as a scan request message directed to a particular type of cloud-based hosted service for example, is designed to gain access to its proprietary framework and retrieve objects based on presented customer information and received customer authorization. The customer authorization is provided to the cybersecurity system, thereby granting access to the retrieval of objects located in the remote service. The object may include email messages, documents, information for connectivity to cloud-based infrastructure, or the like.

Herein, as the number and sophistication of cyberattacks grows, subscribers to cloud-based hosted services are deeply concerned about the privacy and safety of their data. To address these concerns, there is a growing, yet unfulfilled need, for a secondary layer of defense in which customers (or subscribers) utilize their own selected data processing mechanisms, such as the cybersecurity system described below, to analyze their own stored data for malware that, if downloaded, may compromise their networks and/or resources. To gain access to the remote services, such as the cloud-based hosted services described herein, the cybersecurity system obtains the requisite credentials to access the remote service and retrieve stored otherwise present in one or more customer's hosted remote services, such as a cloud-based email service. Upon receipt of the objects, the cybersecurity system submits all or a subset of the retrieved objects to one or more resources that perform analytics on the submitted objects, aggregates results from the analytics, and generates a report based on the analytics of these submitted objects.

As an illustrative embodiment, the cybersecurity system may be configured to (i) retrieve objects (e.g., email messages) from a selected remote service hosting one or more electronic mailboxes and (ii) perform selective analytics on all or a subset of the retrieved email messages (hereinafter, "submitted email messages") in an attempt to detect whether any of the submitted email messages includes malware. In particular, the cybersecurity system, referred to as a "retroactive malicious detection system" (RMDS), identifies a remote service hosting the one or more electronic mailboxes for analysis and retrieves email messages maintained in the hosted electronic mailbox(es) based on permitted access to the remote service using acquired access credentials. Thereafter, the RMDS optionally performs a filtering operation to reduce the number of retrieved email message to a particular subset of "suspicious" email messages, and thereafter, submits each of the subset of "suspicious" email messages to one or more analytic engines for analysis. The selection of the analytic engines may vary, depending on the type of object (e.g., email, file, document, image, etc.), the type of remote service from which the email messages were retrieved (e.g., cloud-based email service, email server, remote file system, etc.), and/or the type of customer issuing the scan request message causing retrieval of the email messages.

The RMDS further performs a correlation of the analytic results directed to the same email message from different analytic engines. This correlation may involve aggregating results from the different analytic engines, where the results include meta-information and other context information gathered during analysis of the email message for malware, along with meta-information associated with the email message prior to submission to the analytic engines. Depending, at least in part, on meta-information obtained from the scan request message that prompted retrieval of the email message (e.g., an identifier assigned to the customer that may imply reason for the scan, etc.), the RMDS may correlate the analytic results differently to account for a different report format.

For example, a scan request message initiated by a customer (e.g., any authorized user of the RMDS such as a subscriber, an cyber-incident investigation and response (IR) team member, etc.) may request analytics to be conducted by all analytic engines and all meta-information generated from the analytics is captured and returned to the RMDS. Upon detecting the IR team identifier as the source initiating the scan request message, the RMDS may perform a more comprehensive aggregation and meta-information retention scheme of the analytic results than normal because the meta-information is also being used to detect susceptibility of the remote service to an attack. This may contradict aggregation and meta-information retention schemes conducted by the RMDS during a periodic scan, where the customer identifier may cause the RMDS to utilize a lesser number of analytic engines or capture and aggregate a lesser amount of meta-information (e.g., timestamp, email source, email title, etc.) for use in classification.

Lastly, the RMDS further classifies the email message as "malicious" or "benign" based on the correlated analytic results from potentially multiple analytic engine(s), which may include aggregating meta-information and other context information received from the multiple analytic engines and weighting the analytic results based on classification rules established for the current threat landscape. The classification rules may be updated on a periodic or aperiodic basis. The context information associated with the email message is organized into a prescribed format, perhaps depending on the customer that initiated the scan request message, that facilitates generation of a malware detection report output from the RMDS. The malware detection report at least identifies the malicious email messages stored within the remote email service along with the context information, such as meta-information associated with the malicious email messages (e.g., customer identifier, source address such as IP address or contents of "FROM:" field, time of receipt, or the like). The malicious detection report (or information within the report) may be provided as an alert to the customer to notify of the presence of malware and response to customer requests to mitigate the malware (e.g., delete email, disinfect, quarantine, etc.) and/or alert the third party platform provider to assist in the mitigation of the malware infection, if necessary.

Hence, the RMDS may be configured to provide an interface for receipt of credentials to access a set of (e.g., one or more) remotely hosted electronic mailboxes. Alternatively, in some embodiments, the RMDS may be configured to exchange authorization tokens (OAuth) with a third-party controlled web server for granting access to at least a set of (e.g., one or more) user mailboxes. The RMDS may generate, based on a classification of the email messages in the authorized set of user mailboxes, a malware detection report describing (i) the classification of each mailbox of the set of authorized mailboxes, (ii) the classification of each email message within the set of authorized mailboxes, and/or (iii) the malicious classification of email message(s) within the set of authorized mailboxes.

In some embodiments, the RMDS may dynamically scale up or down the number of available analytic engines in order to improve and/or maintain throughput as well as preserve analytic resources for specified classes of customers (e.g., trial customers allocated lesser analytic resources than paid subscribers, etc.). Similarly, the RMDS may monitor system properties of the RMDS and limit analyses where certain thresholds and/or traits (e.g. number of subscribers, number of email messages queued for analytics, etc.) are exceeded.

Embodiments of the above-described cybersecurity system (RMDS) are directed to handling email message analytics. However, the RMDS may be applicable to coordinating analytics and reporting of the analytic results for other types of object besides email messages, such as files residing in cloud stored file repositories, stored images and/or videos, or the like.

I. Terminology

In the following description, certain terminology is used to describe aspects of the invention. In certain situations, each of the terms "logic" or "engine" is representative of hardware, firmware, and/or software that is configured to perform one or more functions. As hardware, the logic (or engine) may include circuitry having data processing or storage functionality. Examples of such circuitry may include, but are not limited or restricted to a processor, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic (or engine) may be software in the form of one or more software modules. The software modules may include an executable application, a daemon application, an application programming interface (API), a subroutine, a function, a procedure, an applet, a servlet, a routine, source code, a shared library/dynamic load library, or even one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "electronic device" should be generally construed as electronics with data processing capability and/or a capability of connecting to any type of network, such as a public network (e.g., Internet), a private network (e.g., a wireless data telecommunication network, a local area network "LAN", etc.), or a combination of networks. Examples of an electronic device may include, but are not limited or restricted to, the following: a server, a mainframe, a firewall, a router; or an endpoint device (e.g., a laptop, a smartphone, a tablet, a desktop computer, a netbook, gaming console, a medical device, or any general-purpose or special-purpose, user-controlled electronic device).

The term "meta-information" generally refers to a collection of information associated with an object (e.g., an email message or a portion of the email message; a file or portion of the file, etc.), which may be received from a plurality of remote services (e.g., cloud-based hosted service including one of a cloud-based email service, cloud-based file data store, cloud-based email service, email server, etc.). For example, the meta-information may include information pertaining to a source of a request for an object as provided from a remote service (e.g., customer identifier, device identifier, etc.) and information pertaining to the object (and analyses associated with the object), as described below. Each object may be initially determined to be of an unknown classification (e.g., not previously analyzed or analyzed with inconclusive results), and after an analysis, the object may be determined to be a known classification (e.g., benign or malicious). This classification of an object is referred to as rendering a "verdict."

One type of meta-information is referred to as "consolidated meta-information," including the collection of meta-information pertaining to an object that may analyzed by a single analytic engine or different analytic engines. The consolidated meta-information for an object under analysis may include, but is not limited or restricted to any or all of the following: (a) distinctive metadata pertaining to the object (e.g., hash value, checksum, or other identifier (ID) for an object); (b) one or more verdicts rendered for the object; (c) a timestamp associated with each verdict; (d) a consolidated verdict that is determined based on an aggregate (unweighted or weighted) of verdicts rendered for the object from one or more analytic engines; and/or (e) information directed to the source of the object (e.g., source identifier, etc.).

The term "object" generally refers to content in the form of an item of information having a logical structure or organization that enables it to be classified for purposes of analysis for malware. One example of the object may include an email message or a portion of the email message. Another example of the object may include a storage file or a document such as a Portable Document Format (PDF) document, a word processing document such as Word® document, or other information that may be subjected to cybersecurity analysis. The object may also include an executable such as an application, program, code segment, a script, dynamic link library "dll," URL link, or any other element having a format that can be directly executed or interpreted by logic within the electronic device.

The term "message" generally refers to signaling (wired or wireless) as either information placed in a prescribed format and transmitted in accordance with a suitable delivery protocol or information made accessible through a logical data structure such as an API. Examples of the delivery protocol include, but are not limited or restricted to HTTP (Hypertext Transfer Protocol); HTTPS (HTTP Secure); Simple Mail Transfer Protocol (SMTP); File Transfer Protocol (FTP); iMESSAGE; Instant Message Access Protocol (IMAP); or the like. Hence, each message may be in the form of one or more packets, frames, or any other series of bits having the prescribed, structured format.

The term "computerized" generally represents that any corresponding operations are conducted by hardware in combination with software and/or firmware.

As briefly described above, the term "malware" may be broadly construed as malicious software that can cause a malicious communication or activity that initiates or furthers an attack (hereinafter, "cyber-attack"). Malware may prompt or cause unauthorized, unexpected, anomalous, unintended and/or unwanted behaviors (generally "attack-oriented behaviors") or operations constituting a security compromise of information infrastructure. For instance, malware may correspond to a type of malicious computer code that, upon execution and as an illustrative example, takes advantage of a vulnerability in a network, network device or software, for example, to gain unauthorized access, harm or co-opt operation of a network device or misappropriate, modify or delete data. Alternatively, as another illustrative example, malware may correspond to information (e.g., executable code, script(s), data, command(s), etc.) that is designed to cause a network device to experience attack-oriented behaviors. The attack-oriented behaviors may include a communication-based anomaly or an execution-based anomaly, which, for example, could (1) alter the functionality of a network device in an atypical and unauthorized manner; and/or (2) provide unwanted functionality which may be generally acceptable in another context.

A "remote service" may correspond to a "cloud-based hosted service" or a "hosted service". A cloud-based hosted service may be generally interpreted to be a multi-tenant service made available to users on demand via a public network (e.g., Internet) from one or more cloud computing provider's servers. These servers may include virtual partitions to separate data maintained on behalf of the user in efforts to protect the security and privacy of the data. A "hosted service" may be generally interpreted as a single-tenant service provided by a company's own on-premises servers, which may be hosted by a third-party provider responsible for server management or by an administrator for the company. Examples of a hosted service may include, but is not limited or restricted to a Microsoft® Exchange® server, a file repository, or the like.

In certain instances, the terms "compare," comparing," "comparison," or other tenses thereof generally mean determining if a match (e.g., identical or a prescribed level of correlation) is achieved between two items where one of the items may include content within meta-information associated with the object.

The term "transmission medium" generally refers to a physical or logical communication link (or path) between two or more network devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Retroactive Malicious Detection System (RMDS)

Referring to FIG. 1, a block diagram of an exemplary embodiment of a retroactive malicious detection system (RMDS) 100 is shown. Herein, the operations of the RMDS 100 are directed toward the retrieval and analysis of objects from any of a plurality of third-party controlled, remote services $110_1$-$110_N$, such as a first email cloud-based service $110_1$ hosted by Microsoft® Azure®, a second email cloud-based service $110_2$ hosted by Amazon® Web Services, a data repository $110_3$, an email server $110_4$, or the like. As described herein, the objects may include stored email messages, although the RMDS 100 may be configured to support retrieval and analysis of other types of stored objects (e.g., files, videos, images, documents, etc.).

As shown in FIG. 1, for this embodiment of the disclosure, the RMDS 100 may include content fulfillment logic 120, content acquisition logic 150, content analysis logic 170, and reporting logic 190. The content fulfillment logic 120 is configured to generate a redirect message 130 in response to a scan request message 125. The scan request message 125 corresponds to a request initiated by an electronic device associated with a customer to conduct analytics on content maintained at a remote service (e.g., a cloud-based email service) $110_1$. The individual customer and/or the electronic device controlled by the customer may be referred to herein as the "customer" 105.

According to one embodiment of the disclosure, the redirect message 130 may include a Uniform Resource Locator (URL) link that, when selected, redirects the customer 105 to an authentication portal 135. For this embodiment, the authentication portal 135 may operate as (i) a logon page that may be provided by the remote service $110_1$ (as shown) in order to gain access to its stored contents or (ii) a logon page associated with a trusted third-party web service account (e.g., FaceBook® account, Google® Gmail, DropBox®, etc.) whose authentication is recognized by the remote service $110_1$. The logon page is provided to allow the customer 105 to enter her or his credentials for confirmation by credential verification logic (not shown), which may be hosted at a server associated with the trusted third-party or at a server associated with the remote service $110_1$.

The redirected URL link may further include address information associated with the RMDS 100 (or an identifier described below) for use by the credential verification logic (or logic operating in concert with the credential verification logic) to return information (e.g., credential token 140) upon authentication of the consumer 105. In particular, for this embodiment of the disclosure, upon receipt and verification of the customer credentials, the credential verification logic of the remote service $110_1$ extracts address information for the RMDS 100 included in the redirected URL link and returns the credential token 140 directly to the RMDS 100.

In another similar embodiment, the permitted acquisition of the credential token 140 by the RMDS 100 may be accomplished through an OAuth 2.0 Authorization Framework or a similar framework. For example, the RMDS 100 (or an administrator for the RMDS 100) may register itself as logic that is authorized to operate as an agent for the customer 105 (and other customers) to gain access to stored data pertaining to the customer within the remote service $110_1$. During registration, the RMDS 100 (or the administrator) provides one or more network addresses upon which any issued credentials (e.g., credential token 140) for accessing stored content within the remote service $110_1$ is directed. Upon registration, the RMDS 100 may be assigned an identifier by the remote service $110_1$. Thereafter, the redirect message 130, generated (or prompted) by the RMDS 100 in response to the scan request message 125 seeking authorization to access the stored content within the remote service $110_1$ to perform a malware analysis, may include the identifier for the RMDS 100. The identifier may be used by the remote service $110_1$ to identify a hosted application (e.g., whole or part of RMDS 100) seeking authorization to access the stored data (on behalf of the customer). For some embodiments, the RMDS 100 receives a returned response, which may include a result of the authentication of the customer (Success/Failure) and the credential token 140.

Upon receipt of the credential token 140, the content acquisition logic 150 may obtain requisite objects 160 from the particular remote service $110_1$. As shown, the RMDS 100 may be communicatively coupled to the plurality of remote services $110_1$-$110_N$. The receipt of the credential token 140 enables the RMDS 100 to recover objects 160 from the remote service $110_1$, namely as email messages 160 from one or more user mailboxes maintained within the first cloud-based email service $110_1$ for the customer.

Upon receipt of email messages 160 retrieved from the first cloud-based email service $110_1$, the content acquisition logic 150 analyzes the content of each email message in accordance with object evaluation rules 155 loaded into the RMDS 100 or accessible to the content acquisition logic 150 from a remote source. When operating in accordance with the object evaluation rules 155, the content acquisition logic 150 determines whether any of the recovered email messages 160 is deemed to be "suspicious," namely the email message includes characteristics that encourage further analysis by one or more analytic engines (described below). For example, the object evaluation rules 155, when processed, may identify that any email message including a URL is identified as a "suspicious" email message. Similarly, the object evaluation rules 155, when processed, may identify that any email message including an attachment less than a prescribed size (e.g., in kilobytes) is a "suspicious" email message. The suspicious email messages may be stored in a local data store 165 for subsequent access by the content analysis logic 170. The non-suspicious emails are removed from further analysis.

The content analysis logic 170 may include one or more analytic engines (M≥1), which perform analytics on the suspicious email messages to produce results that are gathered as consolidated meta-information 180 (described below) by analytics correlation logic being part of the content analysis logic 170. The analytics correlation logic organizes the consolidated meta-information 180 from the "M" analytic engines and provides this information to analytics classification logic also being part of the content analysis logic 170. The analytics classification logic determines whether the object is malicious or benign, where such determinations along with at least portions of the consolidated meta-information 180 is provided to the reporting logic 190 for output.

III. RMDS Registration Process

Figure 2:
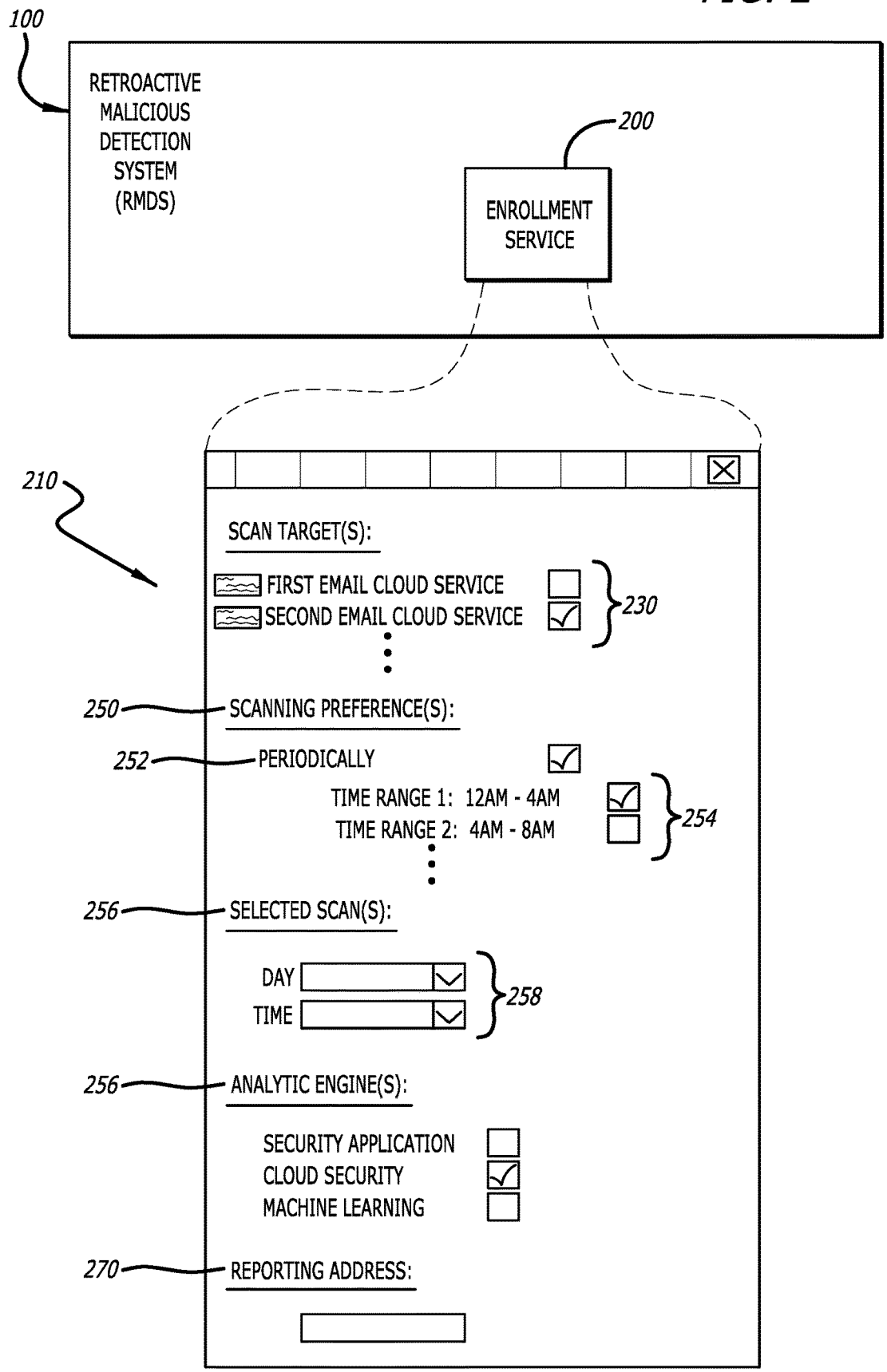
FIG. 2 is an exemplary embodiment of a registration process for the retroactive malware detection system (RMDS) of FIG. 1.

Referring now to FIG. 2, a block diagram of an exemplary embodiment of a registration process for the RMDS of FIG. 1 is shown. The RMDS 100 may be configured as a subscription service, where a customer registers with an enrollment service 200 provided by the RMDS 100. The enrollment service 200 may be configured as (i) a daemon process running in the background where RMDS 100 corresponds to a web-based application or (ii) logic providing certain functionality to the RMDS 100. The enrollment service 200 collects a user name, organization details, administrative details, or other data to uniquely identify a particular customer to the RMDS 100. Additionally, the enrollment service 200 may generate one or more displayable elements 210 (e.g., pop-ups, web pages, etc.) to gather customer preferences 220. These preferences 220 may identify the scan targets 230 such as any of the remote services to which scanning (e.g., analysis of stored objects) is available. The remote services $110_1$-$110_N$ (e.g., first cloud-based email service $110_1$, file depository $110_3$, etc.) may be identified by indicia (e.g., trademark) and/or text characters. Additionally, the preferences 220 may identify (i) scanning preferences 250 such as periodicity of any automated scanning 252 with selectable scan time periods 254 or a prescribed advanced scanning time 256 (e.g., with selectable date/hour 258), and/or (ii) analytic engine preferences 260 (described below) selected by the customer for objects retrieved from a particular remote service $110_1$-$110_N$ or selected by a preselected default setting based at least on the particular type of retrieved object, and/or (iii) a selected network address 270 for use in transmission of malware detection reports after analytics are conducted on the retrieved objects, or the like.

IV. RMDS Internal Architecture

Figure 3:
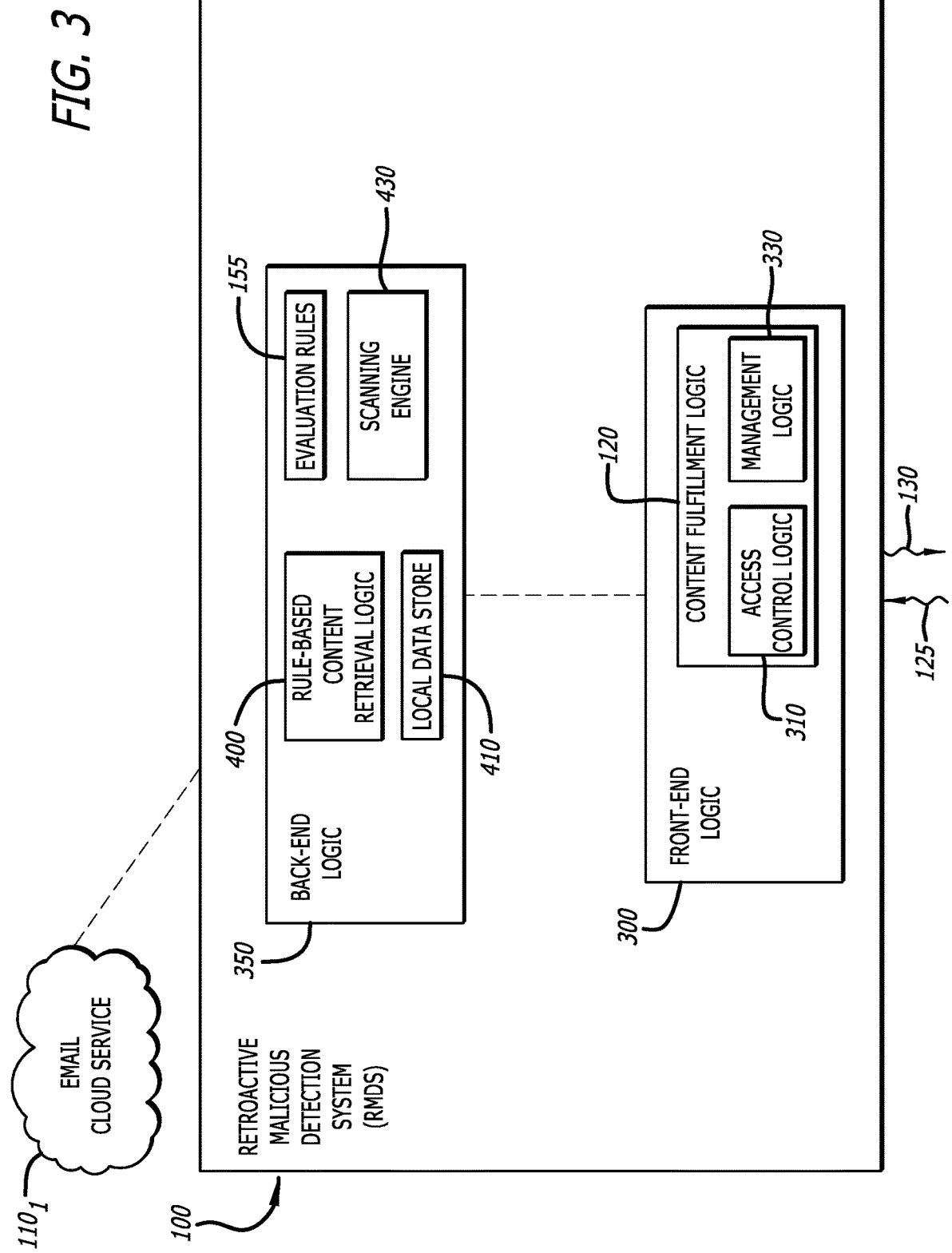
FIG. 3 is an exemplary embodiment of frontend and backend logic deployed within the retroactive malicious detection system (RMDS) of FIG. 1.

Referring now to FIG. 3, an exemplary embodiment of the logic deployed within the retroactive malicious detection system (RMDS) 100 of FIG. 1 is shown. The RMDS 100 includes front-end logic 300 and back-end logic 350. Herein, according to one embodiment of the disclosure, the front-end logic 300 includes the content fulfillment logic 120 of FIG. 1. Featuring access control logic 310 and management logic 330, the content fulfillment logic 120 is configured to receive the incoming scan request message 125 from the particular customer that requests scanning (analysis) of objects within a particular remote service, such as analytics directed to email messages stored within the first cloud-based email service $110_1$ to detect the presence of any malicious email messages. For this example, the customer may operate as an incident response provider that conducts a scan (analytics) of stored email messages within a particular user mailbox or multiple user mailboxes to trace a detected cyberattack back to its source. As another example, the customer may operate as a subscriber to a paid subscription service offered by the RMDS 100, where the scan (analytics) may correspond to a fee-based scan directed to one or more user mailboxes identified by the scan, where the fee may be computed based on the number of mailboxes scanned or the number of email message retrieved for analysis. The scope of the scan may be defined by search parameters set forth in the scan request message 125 or selected upon registration as shown in FIG. 2.

The access control logic 310 is responsible for determining how to access content associated with the scan request message 125. This determination may be based on what remote service is to be accessed in retrieval of the objects for analytics and/or the type of objects being analyzed. For instance, where the scan request message 125 is directed to conducting analytics on email messages within one or more Microsoft® Office 365® email accounts for a particular individual or group of individuals hosted by the first cloud-based email service $110_1$, the access control logic 310 may control certain authentication operations and/or access to particular application programming interfaces (APIs) to obtain credentials for the back-end logic 350 to access these Microsoft® (Outlook) email accounts. Alternatively, where the scan request message 125 is directed to conducting analytics on email messages maintained within one or more Google® mail (Gmail) accounts for a particular individual or group of individuals hosted by the second cloud-based email service $110_2$, the access control logic 310 may control certain authentication operations and access to particular APIs utilized to access content from Gmail accounts. These authentication operations may differ, in whole or in part, from the authentication operations and/or APIs utilized to access stored content in certain Microsoft® (Outlook) email accounts.

The management logic 330 is responsible for monitoring and controlling the scan operations once the access credentials (e.g., credential token) have been secured and content may be retrieved from the particular remote service. As shown in more detail in FIG. 3, the management logic 330 controls operability of rule-based content retrieval logic 400, which is responsible for retrieving objects from the remote service based on at least a portion of the object evaluation rules 155 established for object retrieval for that particular remote service. For instance, a portion of the object evaluation rules 155 utilized by the content retrieval logic 400 of FIG. 4 for retrieval of email messages from the first cloud-based email service $110_1$ hosted by Microsoft® Azure® may be different from a portion of the object evaluation rules 155 followed by the content retrieval logic 400 for retrieval of email messages from the second cloud-based email service $110_2$ hosted by Amazon® Web Services, or even an email server such as a Microsoft® Exchange® server $110_4$. Additionally, or in the alternative, the management logic 330 may be configured to control operability of the scanning engine 430 of FIG. 4, which is responsible for selecting analytic search engines for analyzing the object(s) retrieved from the content retrieval logic 400 and/or a local data store 410 associated with the content retrieval logic 400 being part of the back-end logic 350.

Figure 4:
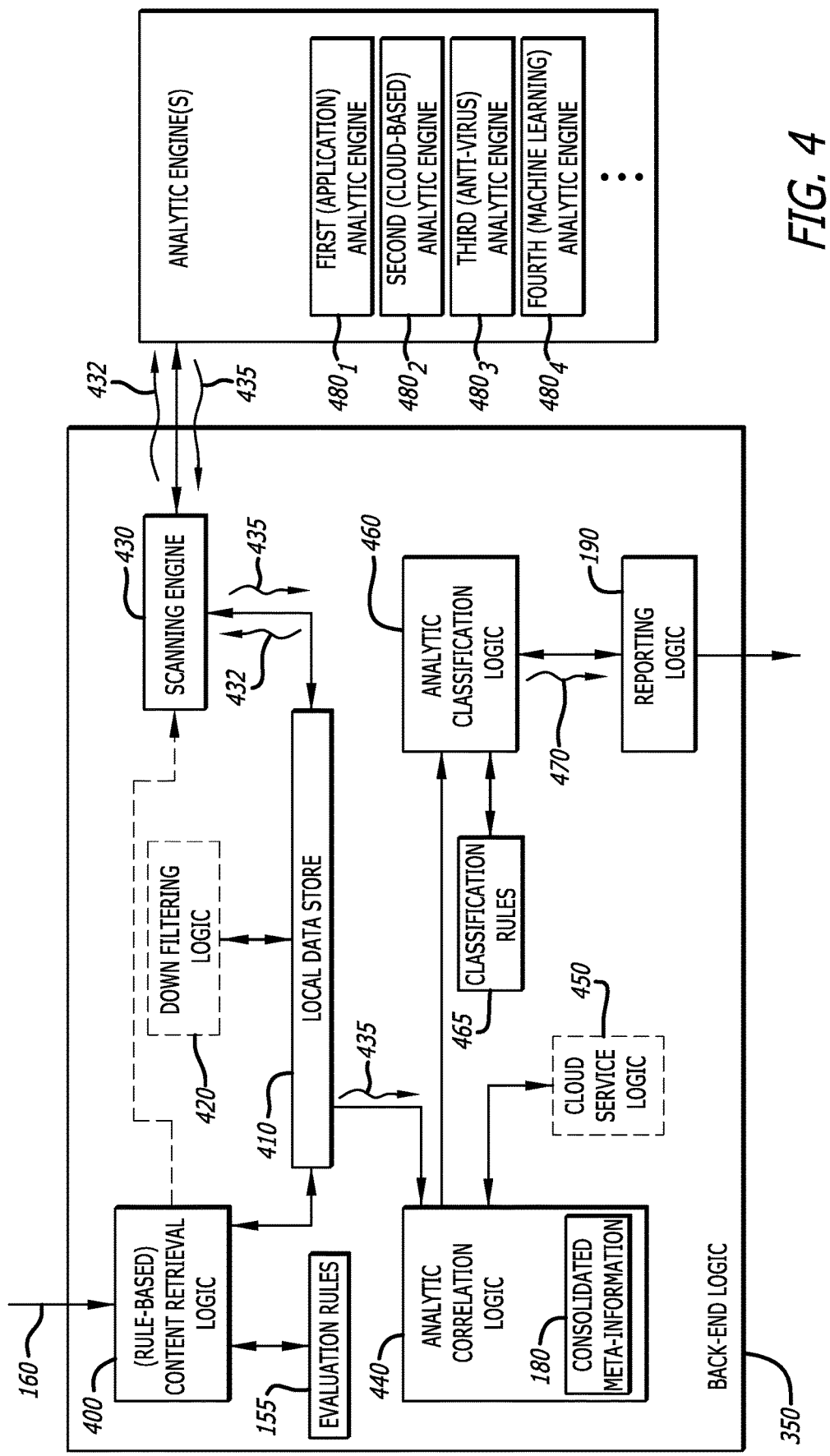
FIG. 4 is a more detailed, exemplary embodiment of the backend logic of the retroactive malware detection system (RMDS) of FIG. 3.

Referring now to FIG. 4, an exemplary embodiment of the backend logic 350 of the RMDS 100 is shown. For this embodiment of the disclosure, the backend logic 350 comprises (i) rule-based content retrieval logic 400, (ii) local data store 410; (iii) down filtering logic 420; (iv) scanning engine 430, (v) analytics correlation logic 440, (vi) cloud services logic 450; (vii) analytic classification logic 460; and (viii) reporting logic 190.

Herein, the rule-based, content retrieval logic 400 is configured to retrieve one or more objects from a particular remote service (e.g., second cloud-based email service $110_2$) of the plurality of remote services $110_1$-$110_N$ upon receipt of corresponding access credentials from the access control logic 310. According to this embodiment of the disclosure, depending on the scan request message 125, the content retrieval logic 400 may retrieve email messages from the second cloud-based email service $110_2$. For example, the scan request message 125 may request an analysis of all email messages associated with a particular user mailbox or a group of user mailboxes. Similarly, the scan request message 125 may request an analysis of a prescribed number of email messages associated with a particular user mailbox or a group of user mailboxes, or an analysis of email messages received and/or sent over a prescribed period of time (e.g., certain hour, day, or any series of days such as a particular week, month, etc.).

The content retrieval logic 400 may further perform one or more preliminary analyses in accordance with object evaluation rules 155 loaded into the RMDS 100 or accessible to the content retrieval logic 400. When operating in accordance with the object evaluation rules 155, the preliminary analyses performed by the content retrieval logic 400 may involve a determination as to whether any of the recovered email messages 160 is deemed to be "suspicious," namely any of the recovered email messages 160 feature characteristics that are suggestive of maliciousness. Examples of certain characteristics may feature inclusion of a URL within a body portion of an email message, inclusion of an attachment, or the like. The suspicious email messages may be stored in the local data store 410 for subsequent access by the scanning engine 430. The non-suspicious email messages may be discarded and precluded from further analysis by one or more data resources, such as one or more analytic engines $480_1$-$480_M$ (M≥1) described below.

As an optional feature, the down filtering logic 420 may be used to further reduce the number of analyses handled by the scanning engine 430. For instance, the content retrieval logic 400 performs the preliminary analysis as a first filter of the recovered email messages 160 to eliminate email messages that are unlikely to be malicious. However, in response to the number (or rate) of email messages being stored within the local data store 410 exceeding a prescribed threshold or scanning engine 430 experiencing difficulties in maintaining a predetermined throughput, the down filtering logic 420 may be utilized as a second filter to reduce the number of email messages for analysis based on further criterion. Continuing this example, email messages with an attachment less than a prescribed memory size (e.g., in kilobytes) are maintained for analysis while email messages with an attachment greater than the prescribed memory size are discarded. The prescribed memory size may be based on the current threat landscape associated with malicious attachments.

As still shown in FIG. 4, the scanning engine 430 is configured to select one or more analytic engines $480_1$-$480_M$ based on meta-information collected during analytics of an email message under analysis and identified during retrieval of the email message (e.g., source identifier, subscriber identifier that may identify a class of subscriber (e.g., IR team, paid subscriber, free-trial user, etc.)). This meta-information may be used to apply limits or expand the number of analytic engines $480_1$-$480_M$ to be used during analytics. According to one embodiment of the disclosure, the analytic engines $480_1$-$480_M$ may include, but are not limited or restricted to any combination of (i) a first analytic engine $480_1$ operating as appliance to analyze network traffic for malware; (ii) a second analytic engine $480_2$ operating as a cloud-based hosted service to analyze network traffic for malware; (iii) a third analytic engine $480_3$ to perform anti-virus analysis; and/or (iv) a fourth analytic engine $480_4$ operating in accordance with machine learning to identify malware based on heuristics or other historical threat detections, or the like.

As an illustrative example, the selection of the analytic engines $480_1$-$480_M$ may be based on customer preferences identified at registration (or subsequent modification of preferences) or may be based on default settings based on the object type and/or remote services from which the object is retrieved. As an illustrative embodiment, the first analytic engine $480_1$ (e.g., security appliance to analyze network traffic) does not support spam detection, while the second (cloud-based) analytic engine $480_2$, performing similar operations on email messages as the first analytic engine $480_1$, performs spam detection. Hence, if the customer prefers and desires spam detection as part of email analytics, the customer preferences may cause the scanning engine 430 to select the second (cloud-based) analytic engine $480_2$ over the first (appliance) analytic engine $480_1$.

More specifically, the scanning engine 430 receives an email message 432 queued in the local data store 410 (or directly from the content retrieval logic 400) and provides the email message 432 to one or more of the analytic engines $480_1$-$480_M$. Each of the selected analytic engines $480_1$ . . . and/or $480_M$ is configured to process content within the email message 432 (e.g., process the email message within a virtual machine during which an URL is selected and operations with certain web servers may be emulated, attachments may be opened, etc.). After processing of the content within the email message 432, the analytic results 435 associated with the email message 432 may be returned to the local data store 410 for subsequent forwarding to the analytics correlation logic 440 or may be forwarded to the analytics correlation logic 440 directly.

Referring still to FIG. 4, the analytics correlation logic 440 is configured to receive analytic results 435 for the email message 432 from potentially different analytic engines and conduct a correlation of the analytic results 435. The correlation may include an aggregation of analytic results from different analytic engines (e.g., analytic engines $480_1$ and $480_4$), where the analytic results include meta-information and other context information associated with the analysis of the email message 432 for malware as well as meta-information collected during retrieval of the email message 432 (e.g., customer identifier, source identifier, etc.). The collection of meta-information and context information may be referred to as "consolidated meta-information 180."

Depending on the customer identifier, the analytics correlation logic 440 may organize the consolidated meta-information 180 differently to account for a different report format. For example, a scan request message initiated by an incident response (IR) team may request analytics to be conducted by all analytic engines $480_1$-$480_M$ and all meta-information generated from the analytics is captured and routed to the analytics correlation logic 440. Based on the customer identifier indicating a source of the scan request message being the IR team identifier, the analytics correlation logic 440 may aggregate the analytic results in a manner to provide a more comprehensive report given the purpose of the scan is to collect any or all meta-information that assist in determining an origin of a cyberattack. This purpose may differ from a scan request message initiated by another subscriber type (e.g., network administrator) that may favor a lesser comprehensive report that merely includes certain types of meta-information (e.g., timestamp, email source, email title, etc.) that assists a network administrator in her or his investigation of lateral movement of the malware.

The analytics correlation logic 440 may be communicatively coupled to the cloud services logic 450. The cloud services logic 450, when requested by the analytics correlation logic 440, attempts to collect additional context information associated with the email message 432 under analysis or associated with any portion of the analysis results 435 associated with the email message 432. The additional context information may be included as part of consolidated meta-information 180 provided to the analytics classification logic 460.

The analytic classification logic 460 is configured to classify the email message 432 as "malicious" or "benign" based on the consolidated meta-information 180 based on classification rules 465 established for the current threat landscape. The classification rules 465 may be updated on a periodic or aperiodic basis. The analytic classification logic 460 is identifies whether the email message 432 includes malware, and if so, at least a portion of the context information 470 within the consolidated meta-information 180 is organized into a prescribed format and provided to the reporting logic 190. The reporting logic 190 renders the context information 470 into a perceivable format for conveyance to an administrator associated with the source issuing the scan request message 125. The reporting logic 190 may issue a malicious detection report (described below) or information from the malicious detection report as an alert message to the customer to notify of the presence of malware, and the RMDS 100 may respond to customer requests to mitigate the malware (e.g., delete email, disinfect, quarantine, etc.) and/or alert the remote service (e.g., second cloud-based email service $110_2$) to assist in the mitigation of the malware infection.

Figure 5:
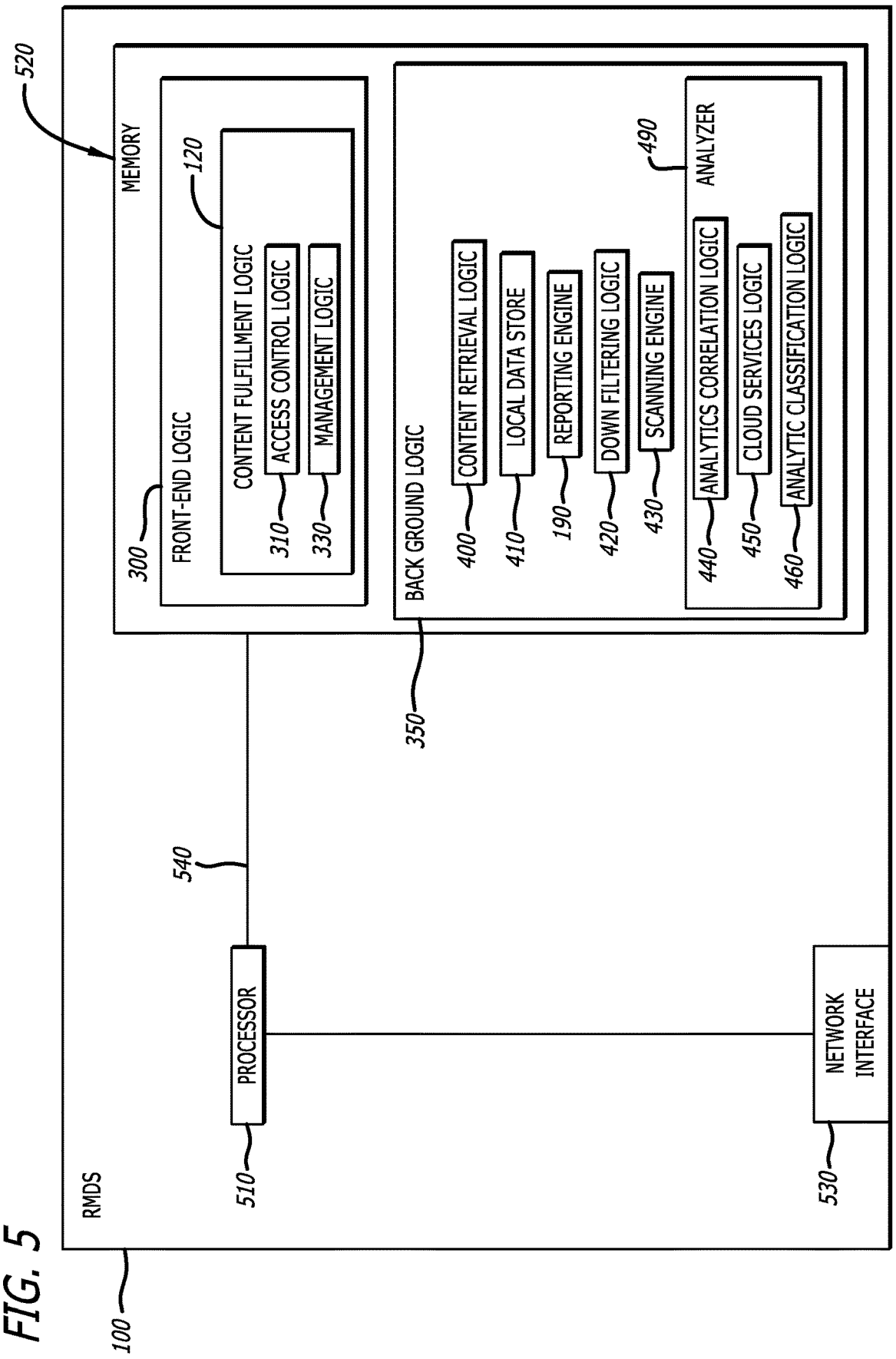
FIG. 5 is an embodiment of an exemplary architecture of the retroactive malware detection system (RMDS) of FIGS. 3-4.

Referring to FIG. 5, an embodiment of an exemplary architecture of the RMDS 100 of FIG. 1 is shown. For this embodiment, the RMDS 100 comprises a processor 510, memory 520 including retroactive evaluation logic 525, and one or more network interfaces 530, which are coupled together by a system interconnect 540, such as a bus. In general, as described below, the retroactive evaluation logic 525, when executed by the processor 510, perform operations that include (i) secures access credentials to one or more remote services; (ii) retrieve objects (e.g., email messages, files, etc.) from a selected remote service; (iii) performs one or more filtering operation prior to providing a subset of the retrieved objects to one or more analytic engines; and (iv) perform correlation of the analytic results to classify the object and reporting of such findings.

Herein, according to one embodiment of the disclosure, the processor 510 is one or more multipurpose, programmable components that accept digital information as input, process the input information according to stored instructions, and provide results as output. One example of a processor may include an Intel® x86 central processing unit (CPU) with an instruction set architecture although other types of processors as described above may be utilized.

The memory 520 operates as system memory, which may include non-persistent storage and/or persistent storage. The memory 520 includes the front-end logic 300 and back-end logic 350, as described above. The front-end logic 300 includes content fulfillment logic 120 that comprises the access control logic 310 and the management logic 330. The back-end logic 350 comprises the rule-based content retrieval logic 400, the local data store 410, the down filtering logic 420, the scanning engine 430, the analytics correlation logic 440, the cloud services logic 450, the analytic classification logic 460, and the reporting logic 190. The operations of software components of the front-end logic 300 and the back-end logic 350, upon execution by the processor 510, are described above.

V. RMDS Operational Flow

Figure 6B:
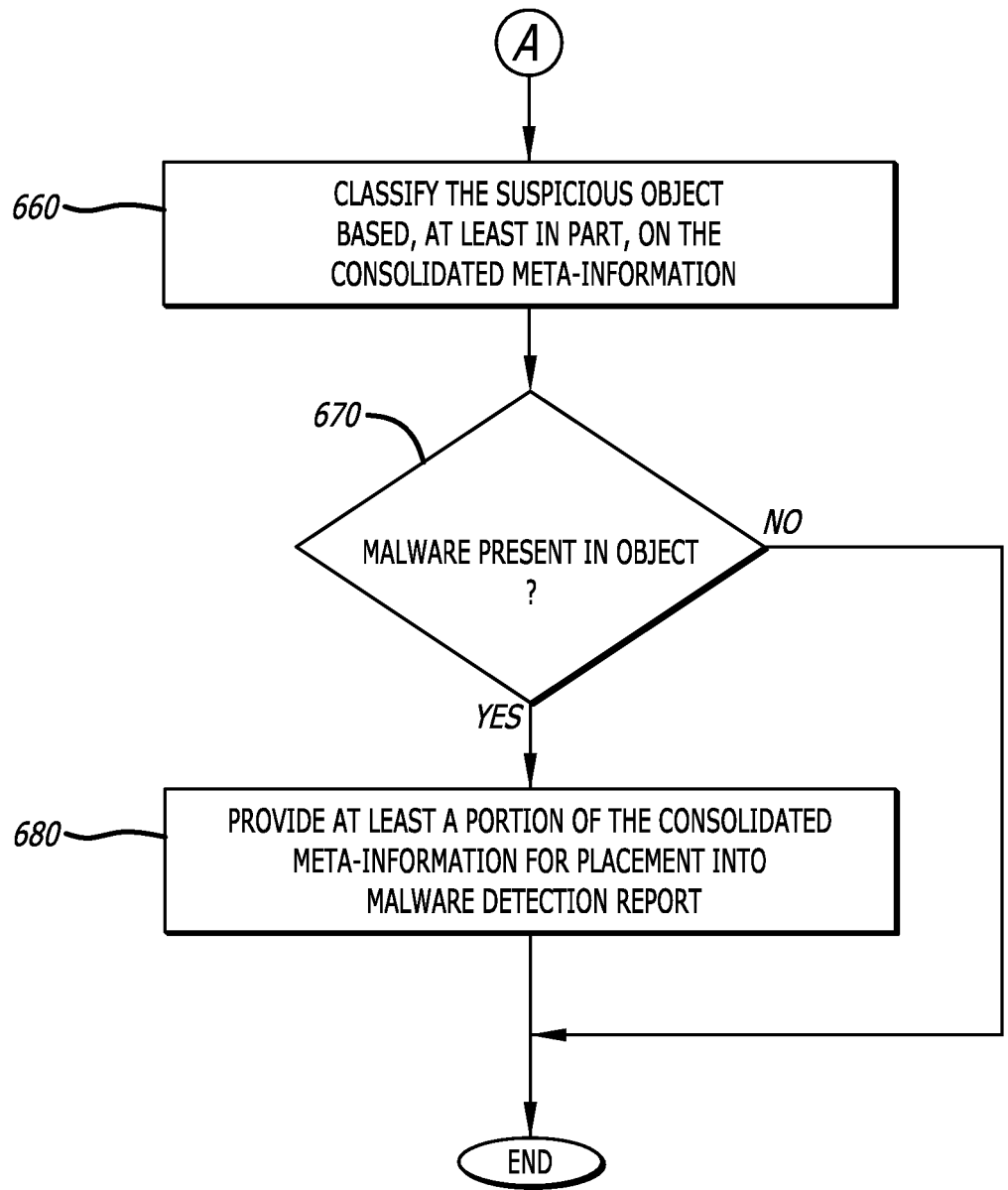

Referring now to FIGS. 6A-6B, an exemplary flowchart of the operations conducted by the retroactive malware detection system (RMDS) 100 in performing analytics of stored objects to detect a presence of malware is shown.

First, as shown in FIG. 6A, the RMDS determines whether access credentials (consent) has been received to access a remote service with stored objects such as stored email messages (block 600). If the access credentials have not been received, the RMDS performs operations to solicit the return of such access credentials (block 610. However, if the access credentials have been received, content retrieval logic within the RMDS retrieves a plurality of objects from the remote service (block 620). These plurality of objects may undergo one or more filtering operations, performed in accordance with a first set of rules, to retain "suspicious" objects, which may be a subset of the plurality of objects. The "suspicious" objects are considered to be, based on the current threat landscape, objects with characteristics that are more apt to be determined to be malicious (block 630). Where the objects are email messages, the filtering operation(s) may involve permitting analytic operations to be conducted on certain types of email messages having (i) a body portion including a URL and/or (ii) an attachment that is lesser in size (e.g., byte size) than a prescribed threshold. This filtering produces a subset of objects that are permitted to undergo analytic operations by one or more analytic engines.

The scanning engine is configured to receive the subset of objects and to process each object of the subset of objects (block 640). More specifically, the scanning engine is configured to (i) receive the subset of objects and (ii) select a plurality of analytic engines for each object of the subset of objects. The selection of the plurality of analytic engine for an object may be based, at least in part, on meta-information associated with that object. The meta-information may include the source identifier (e.g., identifier of the remote service from which the subset of objects has been received), customer identifier (e.g., identifier of a source requesting a scanning operation), or the like.

The RMDS further includes analytic correlation logic, which is configured to aggregate the analytic results received from the analytic engines (block 650). The aggregation of the analytic results, referred to as "consolidated meta-information," where the consolidated meta-information includes meta-information and other context information associated with the analysis of the object for malware as well as meta-information collected during retrieval of the object from the remote service (e.g., customer identifier, source identifier, etc.) that prompted performance of the analytics, as described above.

As shown in FIG. 6B, during or after aggregation of the analytic results to produce the consolidated meta-information, the classification logic conducts an analysis of the consolidated meta-information associated with each retrieved object to determine, based on the consolidated meta-information, whether the retrieved object includes malware (blocks 660 and 670). If so, some or all of the meta-information associated with the retrieved object is maintained and included as part of a malware detection report (block 680). The malware detection report is made available to an administrator associated with a source of the scan request message that prompted the analytics of objects within the remote service. In some embodiments the generated report may include mitigations associated with each malicious object (e.g., quarantine malicious files, prevent retrieval of phishing emails, etc.). Otherwise, the object is considered benign and, according to this embodiment, is excluded from the malware detection report.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A system for detecting objects stored at a remote service, comprising:
a processor; and
a memory communicatively coupled to the processor, the memory includes
content fulfillment logic to (i) receive a scan request message directed to conducting analytics on content within the remote service by at least obtaining credentials for retrieval of a plurality of objects from the remote service and (ii) generate a redirect message in response to the scan request message, the redirect message (a) redirecting communications from a customer to an authentication portal of a third-party controlled service operating as a logon page and (b) configuring receipt of access credentials for the third-party controlled service upon verification of the customer; and
back-end logic to (i) retrieve one or more objects of the plurality of objects using the access credentials, and (ii) perform analytics on each object of the one or more objects to classify each object as malicious or benign by at least (a) analyzing a first object to determine whether the first object includes characteristics that lead to further analyses in order to classify the first object as malicious or benign, (b) selecting one or more analytic engines based on meta-information associated with the first object, wherein each of the one or more analytic engines separately analyzes the first object for malware to produce an analytic result, (c) collecting the analytic results from the one or more analytic engines, and (iv) classifying the first object as malicious or benign based on the collected analytic results.

2. The system of claim 1, wherein the content fulfillment logic to gain access to the content being a plurality of electronic mail (email) messages stored within the remote service operating as an cloud-based email service.

3. The system of claim 1, wherein the content fulfillment logic to gain access to the content being a plurality of files stored within a cloud-based file data store.

4. The system of claim 1, wherein the content fulfillment logic to (i) receive as input a scan request message, (ii) return as output a redirect message to an authorization portal controlling access to the remote service, and (iii) receive a credential token permitting the system access to the remote service.

5. The system of claim 1, wherein the analytic result produced by each of the one or more analytic engines includes meta-information resulting from analysis of the first object within a first analytics engine of the one or more analytic engines.

6. The system of claim 1, wherein the content fulfillment logic to further perform a preliminary analysis of the plurality of objects to eliminate objects unlikely to be malicious to create a subset of the plurality of objects.

7. The system of claim 1, wherein the memory further comprises down filtering logic to reduce a number of objects, including the first object, prior to submission of at least the first object to the back-end logic and analysis by the one or more analytic engines selected based on meta-information accompanying the first object.

8. The system of claim 7, wherein the memory further comprises reporting logic communicatively coupled to classification logic within the back-end logic to classify the first object as either malicious or benign based on the collected analytic results, the reporting logic to generate a report including at least a portion of the meta-information associated with the first object.

9. A computerized method for retrieval and analysis of stored objects for malware, the method comprising:
receiving a scan request message from a customer to conduct analytics on one or more objects stored within a third-party controlled service;
generating a redirect message in response to the scan request message, the redirect message (i) redirecting communications from the customer to an authentication portal of the third-party controlled service operating as a logon page and (ii) configuring receipt of access credentials for the third-party controlled service upon verification of the customer;
retrieving the one or more objects using the access credentials; and
performing analytics on each object of the one or more objects to classify each object as malicious or benign by at least (i) analyzing a first object to determine whether the first object includes characteristics that lead to further analyses in order to classify the first object as malicious or benign, (ii) selecting one or more analytic engines based on meta-information associated with the first object, wherein each of the one or more analytic engines separately analyzes the first object for malware to produce an analytic result, (iii) collecting the analytic results from the one or more analytic engines, and (iv) classifying the first object as malicious or benign based on the collected analytic results.

10. The computerized method of claim 9, wherein the redirect message includes (i) a Uniform Resource Locator (URL) link that, upon selection, redirects communications to the authentication portal of the third-party controlled service and (ii) address information used by the third-party controlled service to return a credential token operating as the access credentials upon verification of the customer.

11. The computerized method of claim 10, wherein the third-party controlled service corresponds to an cloud-based email service and the one or more objects corresponding to one or more email messages stored within the cloud-based email service.

12. The computerized method of claim 10, wherein the authentication portal of the third-party controlled service operates as the logon page for a trusted third-party web service account.

13. The computerized method of claim 9, wherein at least one of the characteristics includes a presence of a Uniform Resource Locator (URL) link in a body portion of an email message being the first object.

14. The computerized method of claim 9, wherein at least one of the characteristics for the first object being an email message includes a presence of an attachment to the email message being less than a prescribed memory size.

15. The computerized method of claim 9, wherein the selecting of the one or more analytic engines based on the meta-information that is collected during the analyzing of characteristics of the first object and during retrieval of the first object from the third-party controlled service.

16. The computerized method of claim 9, wherein the collecting of the analytic results from the one or more analytic engines includes aggregating the analytics results in accordance with a first prescribed format based on an identifier representing a first customer type and aggregating the analytics results in accordance with a second prescribed format based on an identifier representing a second customer type, wherein the first prescribed format differs from the second prescribed format.

17. The computerized method of claim 16, wherein the aggregating of the analytics results in accordance with the first prescribed format being more comprehensive than the aggregating of the analytics results in accordance with the second prescribed format when the first customer type corresponds to an incident response provider being different than the second customer type.

18. The computerized method of claim 11 further comprising:
generating a malware detection report including one or more entries for each object of the one or more objects being classified as malicious, the one or more entries include at least an identifier of the customer and an identifier of a source of each email message of the one or more email messages.

* * * * *